Figure 1:
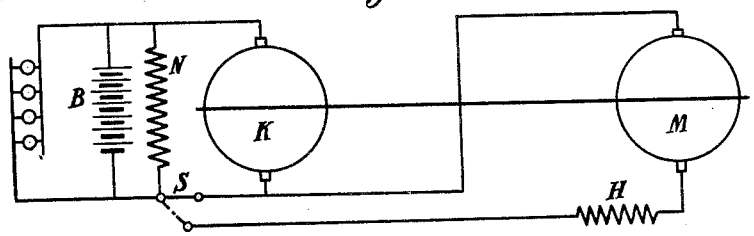

Feb. 9, 1932.    G. E. W. GÖLZ    1,844,322

ELECTROMAGNETIC POWER TRANSMISSION MECHANISM

Filed April 7, 1928

Inventor
Georg Emil Wilhelm Gölz
By Knight Bros
Attorneys

Patented Feb. 9, 1932

1,844,322

UNITED STATES PATENT OFFICE.

GEORG EMIL WILHELM GÖLZ, OF KIRCHHEIM-TECK, GERMANY

ELECTROMAGNETIC POWER TRANSMISSION MECHANISM

Application filed April 7, 1928, Serial No. 268,354, and in Germany April 16, 1927.

In dynamo-electrical power transmission mechanisms, for example, of the Entz type, described in "Mechanical Engineering" of August and September, 1926, or in the patent to Entz, No. 1,207,732, December 12th, 1916, which are composed of a coupling-dynamo (generator) as primary machine and a secondary machine, a mechanically connected, so-called rear motor, it is a common thing to obtain the electric current required for lighting, for excitation and for other purposes, from accumulator batteries, which are charged by the driving mechanism, during the time the drive is entirely through the coupling-dynamo. This coupling dynamo consists of an armature rotatable with the main drive shaft of the prime mover. The field structure surrounding the generator armature is rigidly fixed to the armature of the rear motor and the driven shaft and thereby is adapted for rotation. The field structure of the rear motor fixedly surrounds the rear motor armature. As fully described in the above mentioned patent, in the course of starting the mechanism, the torque developed by the rear machine, operating as a series type motor, by the current fed thereto from the forward machine, operating as a series generator, aids in attainment of the desired speed of the driven shaft. When the operating speed is attained, the relative movement or "slip" between the armature and field units of the generator is slight, causing the same to act in the manner of a magnetic clutch, to transmit the mechanical movement of the prime mover to the driven shaft. Charging of the battery is accomplished during this period by the rear motor, which in this method of operation is cut out of the power transmission, i. e. is running along idle, but for the purpose of charging the battery is provided with a special winding in which the current that is required for charging is generated. Generally the rear motor is switched in such a manner as to make it act as a differential generator. But when the rear motor is also engaged for power transmission, that is when it is running as a motor, a delivery of current from it is no longer possible; with this form of operation the current required for excitation, for lighting, etc., must be taken exclusively from the battery, which may cause the latter to become exhausted too soon and thereby make a further operation impossible. In using this kind of driving mechanism for power transmission with power vehicles, one runs the risk of getting stalled on the road on account of exhaustion of the battery.

This disadvantage is overcome according to the present invention by the fact that the light plant and the excitation are fed by the slip current of the coupling-dynamo. In this way the supply of current for the purposes of lighting, excitation, etc. is guaranteed with every kind of operation, so that the current cannot give out. The arrangement preferably is made so that the slip current feeds a battery which is connected parallel to the exciter winding of the coupling-dynamo. From this battery is obtained the current for lighting and, when not running, also the current required for starting the combustion motor by means of the power transmission mechanism. Since the battery is parallel to the exciter winding, the excitation is determined by the voltage of the battery. It can therefore vary only between the charging voltage and the normal or discharge voltage of the battery. This limitation of the variations of voltage is generally sufficient for an orderly operation.

The attached drawings show schematically the connection arrangement of such a power transmission mechanism for different conditions of operation.

Figure 2:
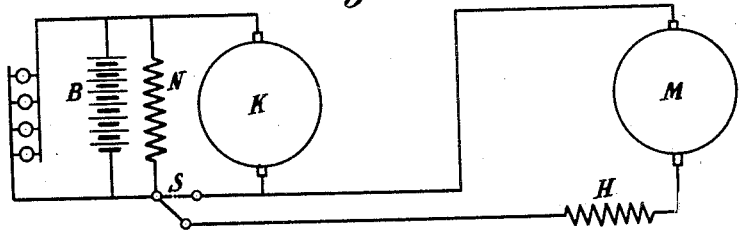
Figure 3:
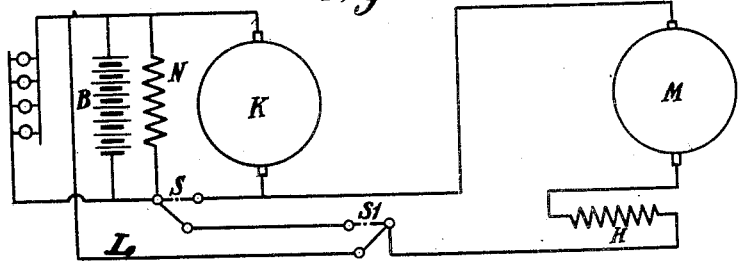
Figure 4:
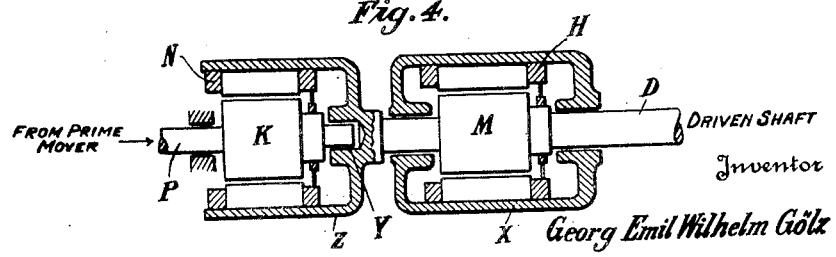

Figs. 1, 2, and 3 are circuit diagrams illustrating my invention, showing three different connections, and Fig. 4 is a diagrammatic section of the power transmission mechanism.

On the power shaft P of a prime mover, or on a shaft coupled to the power shaft of a prime mover, is mounted an armature K (Fig. 4) of a coupling-dynamo having an exciter winding N. The term coupling-dynamo refers to a machine which part of the time acts as a magnetic coupling, and at other times acts as a generator. The winding N is mounted in a casing Z fixed on the end of a driven shaft D. The end of shaft P is journalled in a bearing Y at the end of shaft D. On the shaft D, which is rotatably mounted in a stationary casing X, is an armature M, surrounded by a stationary field winding H on the casing X. That part of the system included by the casing X is referred to herein as a rear motor.

Fig. 1 shows the connection of the generator at the time it exercises a pure coupling effect. The series winding thereof is tied in with the generator brushes, which in effect, short-circuits them. The battery B is disposed in parallel across the terminals of the series winding, the potential difference across which is employed to charge the battery. The resistance of winding N is especially designed with reference to the battery terminal voltage in order to charge the same at the time that the series generator is short-circuited. The potential that is limited by the battery B is then employed for lighting and other purposes necessary upon a vehicle, which require an electric current.

Fig. 2 shows the connection when operating with the rear motor M, H whose series winding H, in this case, is connected through the switch S with coupling-dynamo K, N. The battery B is fed by the slip current with this mode of operation also, while a constant current is conducted to the exciter.

Fig. 3 shows, how the connection can be made suitable also for the reversal of the power transmission mechanism for running in the opposite direction, by means of additional switch S 1, which can be controlled from the place of the operator to complete a series circuit through conductor L and the two machines. In this case the battery is discharged in accordance with the required exciter current. This kind of connection is especially suitable for braking vehicles. If the gas supply has been cut-off, so that the prime mover runs idly, the rear motor is driven by the axle of the vehicle, and therefore acts as generator and drives the prime mover by way of the coupling-dynamo K, N which now acts as a motor. In this case the prime mover acts in the familiar way as a compressor, which consumes power corresponding to its speed of revolution and thereby acts as a brake.

The advantages of the new arrangement consist especially in the independence of the kind of operation from the state of charge of the battery, and in the simplification of the connection, since the field winding of the coupling-dynamo always works independently of the strength of the current and voltage of the dynamo. Thereby the excitation, and, in combination with a known counter compound winding of suitable form, the torque of the coupling-dynamo can be kept constant within the limits required by practical use under all conditions of operation.

Having thus described my invention, what I claim is:

1. A dynamo electric transmission for vehicles of the type described, comprising a coupling generator, a rear motor mechanically connected and adapted to be electrically connected to said generator, said generator being of the series wound type and comprising a series winding, a battery permanently connected across said winding for both electrically connected and disconnected conditions of the rear motor with reference to said generator.

2. A dynamo electric transmission for vehicles of the type described, comprising a coupling generator, a rear motor mechanically connected and adapted to be electrically connected in series to said generator, said generator being of the series wound type and comprising a series winding, means for simultaneously short-circuiting said generator and for disconnecting said motor therefrom, and a battery permanently connected across said series winding, adapted to be charged by said generator for both connected and disconnected conditions of the motor with reference to the generator.

3. A dynamo electric transmission for vehicles of the type described, comprising a coupling generator, a rear motor mechanically and electrically connected to said generator, said generator being of the series wound type and comprising a series winding, a battery permanently connected across said winding, means for braking said vehicle comprising means for operating said rear motor as a generator and said generator as a motor.

4. The combination claimed in claim 3 wherein said last mentioned means further comprises a switch and a conductor element for operating said rear motor as a generator and said generator as a separately excited motor.

5. A dynamo electric transmission for vehicles of the type described, comprising a driving shaft, a driven shaft, an armature structure of an electrical generator mounted upon said driving shaft, a complementary field structure of said generator mounted upon said driven shaft, an armature of an electrical motor mounted upon said driven shaft, a complementary field structure for said motor mounted upon the frame of said vehicle, said motor being adapted to be fed by current derived from said generator when the relative movement between the armature and field structures of the generator is great, and a battery permanently connected across the field winding of said generator adapted to be charged by the current derived from said generator when the relative movement between the armature and field structures of the generator is slight as well as great.

In testimony whereof I affix my signature.

GEORG EMIL WILHELM GÖLZ.